United States Patent
McCormick et al.

(10) Patent No.: US 10,956,506 B1
(45) Date of Patent: Mar. 23, 2021

(54) QUERY-BASED DATA MODIFICATION

(71) Applicant: Amazon Technologies, Inc., Seattle, WA (US)

(72) Inventors: Kevin Michael McCormick, Seattle, WA (US); Christopher Wiswall Greene, Seattle, WA (US); Alex Kharbush, Seattle, WA (US); David Anthony Leen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 558 days.

(21) Appl. No.: 15/617,098

(22) Filed: Jun. 8, 2017

(51) Int. Cl.
| | | |
|---|---|---|
| *G06F 17/00* | (2019.01) | |
| *G06F 7/00* | (2006.01) | |
| *G06F 16/9038* | (2019.01) | |
| *G06F 16/2457* | (2019.01) | |
| *G06F 16/903* | (2019.01) | |
| *G06F 3/0484* | (2013.01) | |
| *G06F 3/0486* | (2013.01) | |
| *G06F 40/211* | (2020.01) | |

(52) U.S. Cl.
CPC .... *G06F 16/9038* (2019.01); *G06F 16/24578* (2019.01); *G06F 16/90335* (2019.01); *G06F 3/0486* (2013.01); *G06F 3/04842* (2013.01); *G06F 40/211* (2020.01)

(58) Field of Classification Search
CPC .......... G06F 16/9038; G06F 16/90335; G06F 16/24578; G06F 3/04842; G06F 3/0486; G06F 17/271

USPC ......................................................... 707/733
See application file for complete search history.

(56) References Cited

U.S. PATENT DOCUMENTS

| | | | | |
|---|---|---|---|---|
| 6,775,666 B1 * | 8/2004 | Stumpf | ............... | G06F 16/3334 707/999.004 |
| 7,953,730 B1 * | 5/2011 | Bleckner | ............... | G06F 16/951 707/722 |
| 8,078,603 B1 * | 12/2011 | Chandratillake | ....... | G06F 16/74 707/706 |
| 8,214,361 B1 * | 7/2012 | Sandler | ................. | G06F 16/951 707/732 |
| 8,606,611 B1 * | 12/2013 | Fedorov | ............... | G06Q 10/103 705/7.13 |
| 9,026,915 B1 * | 5/2015 | Ehlen | .................... | G06F 40/166 715/728 |
| 9,684,882 B2 * | 6/2017 | Azmoon | .......... | G06Q 10/06311 |
| 2003/0140037 A1 * | 7/2003 | Deh-Lee | ................. | G06F 16/93 707/999.003 |
| 2003/0149714 A1 * | 8/2003 | Casati | .................... | G06Q 10/10 718/100 |
| 2007/0043821 A1 * | 2/2007 | Brumfield | .............. | G06Q 10/10 709/207 |

(Continued)

*Primary Examiner* — Pavan Mamillapalli
(74) *Attorney, Agent, or Firm* — BakerHostetler

(57) ABSTRACT

Techniques for query-based data modification are described herein. In some examples, a first search of searchable data may be performed based, at least in part, on a first query. A second search of the searchable data may be performed based, at least in part, on a second query. One or more results of the first search may be provided. Input may be received for associating a first result of the first search with the second search. At least a first modification, related to the input, to perform on the searchable data may then be determined. The first modification may then be performed on the searchable data.

17 Claims, 12 Drawing Sheets

(56) References Cited

U.S. PATENT DOCUMENTS

| | | | |
|---|---|---|---|
| 2007/0073575 A1* | 3/2007 | Yomogida | G06Q 10/06311 705/7.15 |
| 2007/0162907 A1* | 7/2007 | Herlocker | G06Q 10/10 718/100 |
| 2008/0201191 A1* | 8/2008 | Carter | G06Q 10/06 705/7.22 |
| 2008/0306806 A1* | 12/2008 | Van Wyk | G06Q 10/06316 705/7.26 |
| 2008/0313024 A1* | 12/2008 | Kunichika | G06Q 10/0633 705/7.15 |
| 2009/0222743 A1* | 9/2009 | Hadfield | H04L 12/1822 715/753 |
| 2009/0234699 A1* | 9/2009 | Steinglass | G06Q 10/06313 705/7.23 |
| 2011/0078129 A1* | 3/2011 | Chunilal | G06F 16/9535 707/706 |
| 2014/0258882 A1* | 9/2014 | Latzina | G06Q 10/103 715/751 |
| 2015/0254406 A1* | 9/2015 | Rajasenan | G16H 40/20 705/2 |

\* cited by examiner

901 Hi – I wasn't certain to who you wished to assign Result 222. Here are some possible choices:

☐ Assign to Bob

☐ Assign to Carol

☐ Assign to Bob and Carol

☐ Assign to Bob's and Carol's Department

902 Hi – I wasn't certain to who you wished to assign Result 222. However, I noticed that you have recently assigned a number of results to Bob. Would you also like to assign Result 222 to Bob?

☐ Confirm Assignment to Bob

☐ See some other options

903 Hi – I wasn't certain to who you wished to assign Result 222. However, I noticed that Bob and Carol work together in the same department. Would you like to assign Result 222 to Bob's and Carol's department?

☐ Confirm Assignment to Bob's and Carol's Department

☐ See some other options

904 Hi – I wasn't certain to whom you wished to assign Result 222. However, I noticed that Result 222 relates to a task that is due tomorrow. Bob is on vacation tomorrow. However, Carol is working tomorrow and is available all day. Would you like to assign Result 222 to Carol?

☐ Confirm Assignment to Carol

☐ See some other options

FIG. 9

QUERY-BASED DATA MODIFICATION

BACKGROUND

Many computing systems allow users to organize and store data using a hierarchical organization system, such as a tree-based and/or folder-based organization system. Hierarchical organization systems are popular with many users because they provide a simple system for organizing data. However, hierarchical organization systems have a number of associated drawbacks. For example, hierarchical organization systems may restrict users to a particular organizational convention, even when the particular organizational convention may not be familiar or natural to the user. Moreover, hierarchical organization systems may be unable to resolve complex modifications of data items, such as modifications in which the user's intent may be ambiguous or may have more than one possible outcome. In addition to hierarchical organization systems, another common data management technique is a search-based system, in which users may formulate queries to search underlying data. Search-based systems may appeal to users by allowing users to submit queries that target specific data that is of interest to the users. However, many search-based systems may also be inefficient, such as by forcing users to repeatedly formulate queries and offering limited, if any, capability to modify the underlying data being searched.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 9 is a diagram illustrating example intent determination interfaces that may be used in accordance with the present disclosure.

DETAILED DESCRIPTION

Figure 1:
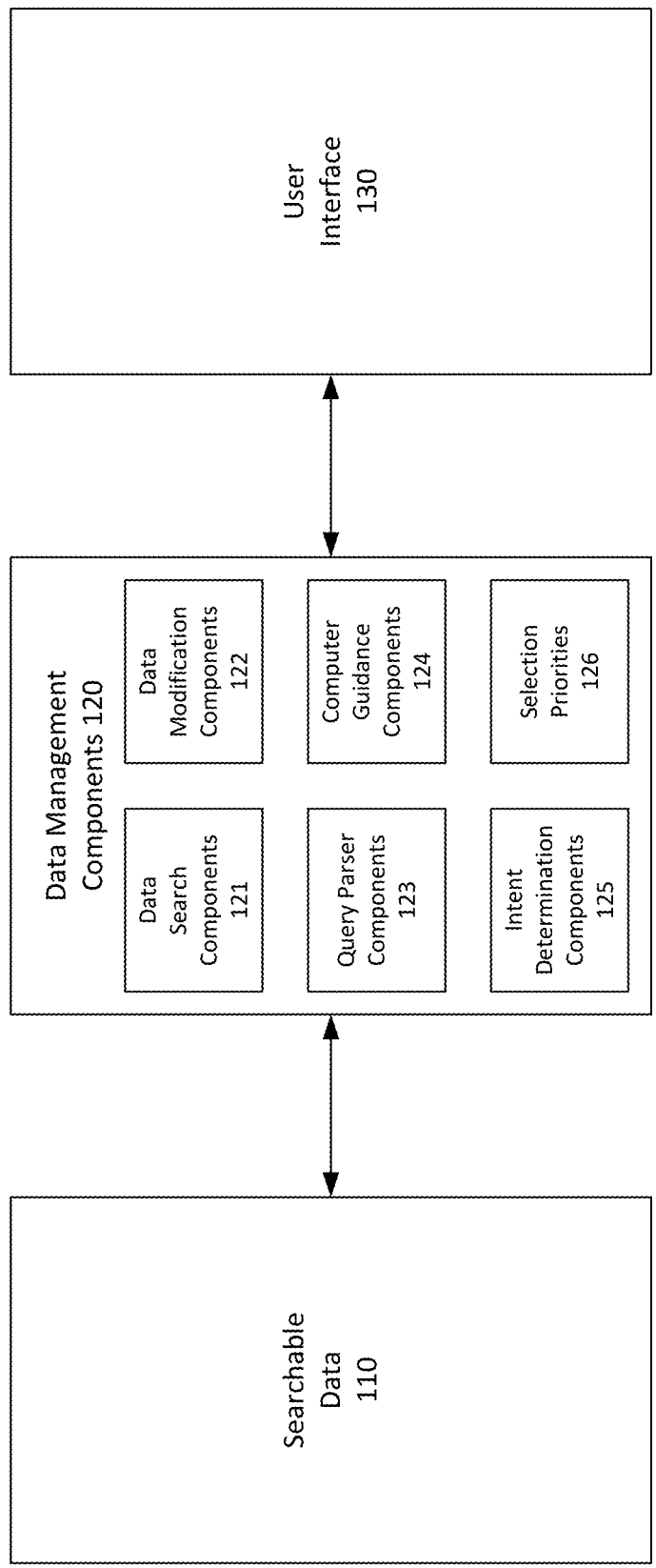
FIG. 1 is a diagram illustrating an example query-based data modification system that may be used in accordance with the present disclosure.

Techniques for query-based data modification are described herein. In some examples, users may formulate and submit queries for searching of a searchable data collection, such as one or more databases, information services, documents, tables, or other collections of searchable information. The queries may be executed on the searchable data, and results may be obtained and provided to a user. For example, a user may submit a first query for tasks assigned to Alice and a second query for tasks assigned to Bob. In some examples, the query results may be displayed in separate display areas, such as separate folders, pages, windows, or other types of separate display areas. For example, a first result set including tasks assigned to Alice may be displayed in a first display area, and a second result set including tasks assigned to Bob may be displayed in a second display area.

In some examples, a user may edit the retrieved result sets, such as by moving one or more search results from one result set to another result set. For example, the Alice result set may include a first result, such as a task to generate a spreadsheet, thereby indicating that this task is currently assigned to Alice. The user may then decide to move (e.g., via drag and drop) this particular search result from the Alice result set to the Bob result set. The user may perform this action to indicate that the user wishes to re-assign the task of generating a spreadsheet from Alice to Bob. In some examples, upon receiving this user input, an analysis may be performed in order to determine the user's intent with respect to the input. For example, a comparison of the first query (the Alice query) and the second query (the Bob query) may be performed in order to assist in determining the user's intent. In particular, in some cases, the first query and the second query may be parsed and compared, one or more differences between the parsed queries may be identified, and the user's intent may then be determined based, at least in part, on the identified differences. In particular, in the above example, it may be determined that the only difference between the first query and the second query is the individual to whom the requested tasks are assigned. Thus, it may be determined that the intent of the user input is to re-assign the generate spreadsheet task from Alice to Bob. In some examples, upon determining the intent of the received user input, the underlying searchable data may be modified, on the user's behalf, in accordance with the determined intent. For example, in some cases, one or more values of one or more attributes of the searchable data may be modified, such as values associated with one or more tables, columns, rows, cells, entries, nodes, objects, entities, fields, tags, or any other attributes that may be used to organize and store searchable data.

In some cases, when a user edits retrieved search result sets, the user's intent may be clearly determined using an analysis such as described above. For example, the above described analysis may clearly indicate that the intent of the user's input is to re-assign a task from Alice to Bob. However, in some other cases, the user's intent may be ambiguous or may otherwise be interpreted to indicate more than one possible outcome. For example, consider a scenario in which, instead of requesting tasks assigned to Bob, the user requests tasks assigned to Bob or to Carol. In this scenario, query results may be displayed in a first result set (include results for tasks assigned to Alice) and a second result set (including results for tasks assigned to Bob or to Carol). Upon display of these result sets, the user may again edit the retrieved result sets, such as by moving the generate spreadsheet task from the Alice result set to the Bob or Carol result set. In this scenario, however, the user's intent may be ambiguous, for example because it may be unclear whether the user wishes to re-assign the generate spreadsheet task to Bob, to Carol, or to both.

In cases when the intent of user input is ambiguous, various different techniques may be employed in order to select one or more appropriate modifications to perform upon the underlying searchable data. In particular, in some cases, various selection priorities may be employed to select the appropriate modifications, such as prior user selections, common data attributes, result availability, and other selection priorities. For example, if the user had previously indicated that another task dragged to the Bob or Carol result set should be re-assigned to Bob, then this may indicate that the user's intent is similarly to re-assign the generate spreadsheet task to Bob. As another example, if Carol and Bob share a common data attribute, such as being members of particular department, then this may indicate that the user's intent is to re-assign the generate spreadsheet task to Carol's and Bob's department. As yet another example, availability data for Bob and Carol may indicate that Carol has availability to perform the generate spreadsheet task and that Bob does not have availability, and this may cause the generate spreadsheet task to be re-assigned to Carol instead of Bob. In some examples, if the selection priorities do not resolve the ambiguity associated with a user's edits, then the user may be asked to select (and/or to confirm a selection) between Bob and Carol. Also, in some examples, various visual aids and/or other interfaces may be provided to assist the user in making a selection, such as interface that displays possible user intents, categorizes, ranks and/or orders the intents, displays Bob's and Carols' availabilities, their common department or other common attributes, and many other types of information.

Thus, the techniques described herein may allow search results to be displayed and edited, to have the intent of such edits analyzed and determined, and to modify underlying searchable data based on the determined intent. While the described techniques may optionally employ the use of folders as visual tools (e.g., to display search results, etc.), the use of folders (or other similar hierarchical constructs) is not required for storing or organization of underlying searchable data. This may provide a number of advantages relative to certain conventional folder-based and other hierarchical organization systems and/or pure search-based systems. For example, users are not restricted to a particular organizational convention or tree structure. Rather, search results may be organized and edited in a natural and intuitive manner. Additionally, the described techniques allow underlying searchable data to be modified on the user's behalf, which may be particularly advantageous for processing complex edits, for processing of multiple different edits (e.g., multiple drag and drops in succession) and/or to allow rapid cleanup and organization, such as when operated in bulk mode. Moreover, the described techniques may effectively resolve ambiguous edits, such as based on various selection priorities, and may provide computer-aided guidance to inform the user of available modifications and assist the user in selecting between them.

FIG. 1 is a diagram illustrating an example query-based data modification system that may be used in accordance with the present disclosure. As shown in FIG. 1, a user interface 130 may be provided that allows users to search and modify searchable data 110 via data management components 120. Searchable data 110 may include, for example, one or more databases, information services, documents, tables, or other collections of searchable information. User interface 130 may allow users to formulate and submit queries for searching of searchable data 110. In some examples, queries may be formulated by users in a format and/or language that may be executable upon the searchable data 110. In one specific example, searchable data 110 may include a relational database management system (RDBMS), and queries may be formulated using structured query language (SQL) or another language for searching of an RDBMS. Other languages used to store data and/or formulate queries may include JavaScript Object Notation (JSON), Extensible Markup Language (XML), and any number of other languages or formats. The queries may be received and executed on the searchable data 110 by data search components 121. In some examples, data search components 121 may include one or more interfaces provided by or otherwise associated with searchable data 110, such as database front ends or data service front ends. Also, in some examples, data search components 121 may include generic interfaces that are capable of interacting with a variety of different types of underlying searchable data, such as by using a variety of different languages and/or data formats. In some examples, data search components 121 may be capable of converting queries submitted by users into a language and/or format that is executable on the underlying searchable data 110. Also, in some examples, as opposed to providing fully formulated queries, users may instead provide one or more indications of search parameters (e.g., an indication of various attributes and/or parameters) and data search components 121 may formulate one or more queries based on the provided search parameters.

Figure 2:
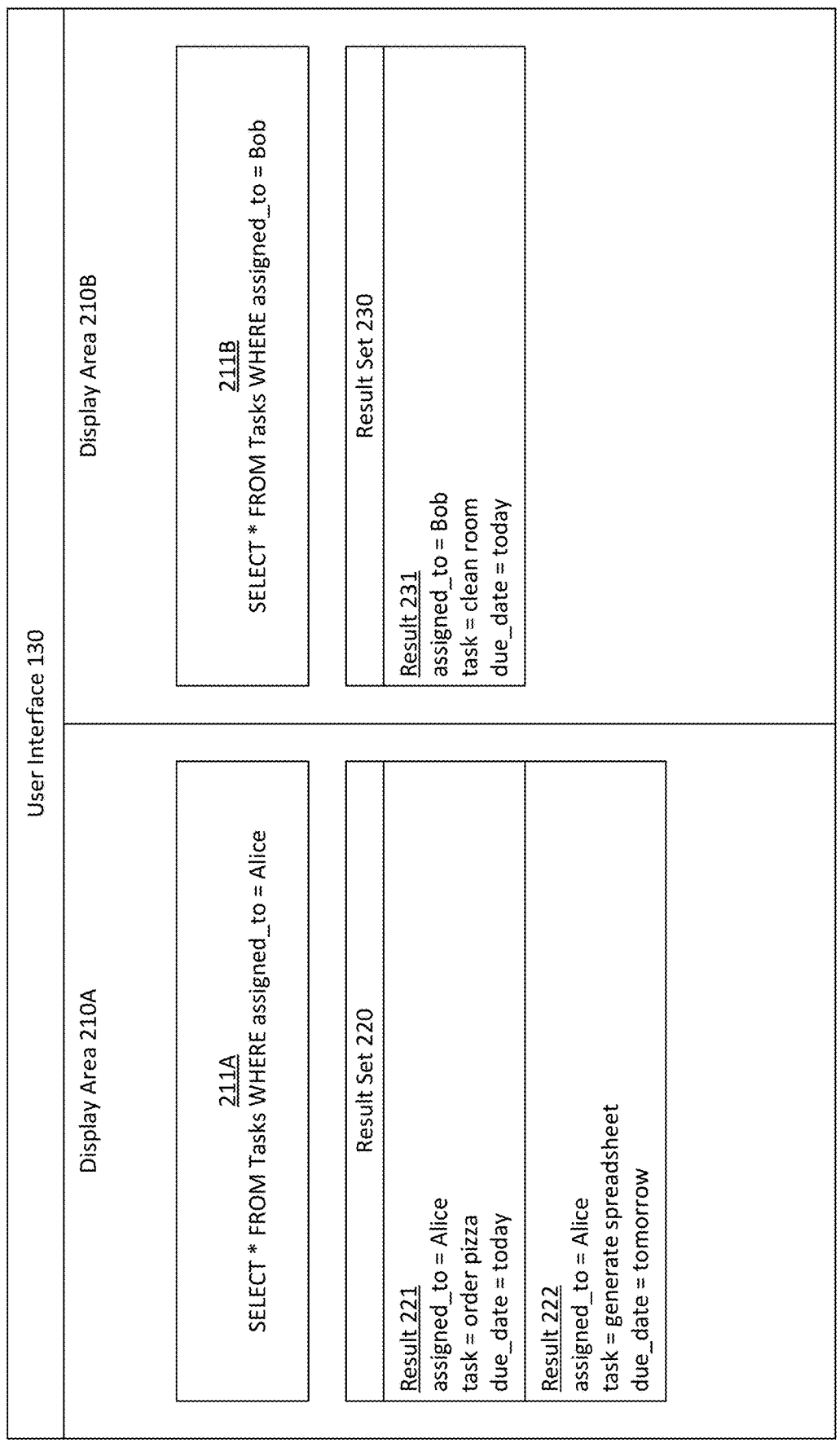
FIG. 2 is diagram illustrating first example search results that may be used in accordance with the present disclosure.

In some examples, data search components 121 may execute search queries upon the searchable data 110 and provide results of the searches to user interface 130 for display. Referring now to FIG. 2, some example queries and search results will now be described in detail. As shown in FIG. 2, a user has submitted a first search query 211A and a second search query 211B. In the particular example of FIG. 2, queries 211A and 211B are formatted in SQL, and the underlying searchable data 110 includes relational data. As set forth above, however, any number of other languages and/or formats may be employed for organizing, storing and/or searching searchable data 110. As shown in FIG. 2, query 211A is SELECT * FROM Tasks WHERE assigned_to =Alice. This query may request all columns from a Tasks table where an assigned_to value is equal to Alice. As also shown in FIG. 2, query 211B is SELECT * FROM Tasks WHERE assigned_to =Bob. This query may request all columns from the Tasks table where the assigned_to value is equal to Bob.

As shown, user interface 130 includes two display areas 210A and 210B. Display area 210A includes a result set 220 for query 211A, while display area 210B includes a result set 230 for query 211B. In the particular example of FIG. 2, displays areas 210A and 210B are displayed side-by-side within user interface 130. It is noted however, that display areas 210A and 210B may be displayed using any desired types of interfaces, such as using different folders, pages, windows, or other types of display areas. In the example of FIG. 2, Result set 220 includes two results 221 and 222.

Result 221 is for a task of ordering a pizza, which is assigned to Alice and which is due today. Result 222 is for a task of generating a spreadsheet, which is assigned to Alice and which is due tomorrow. Result set 230 includes a single result 231. As shown, result 231 is for a task of cleaning a room, which is assigned to Bob and which is due today.

Figure 3:
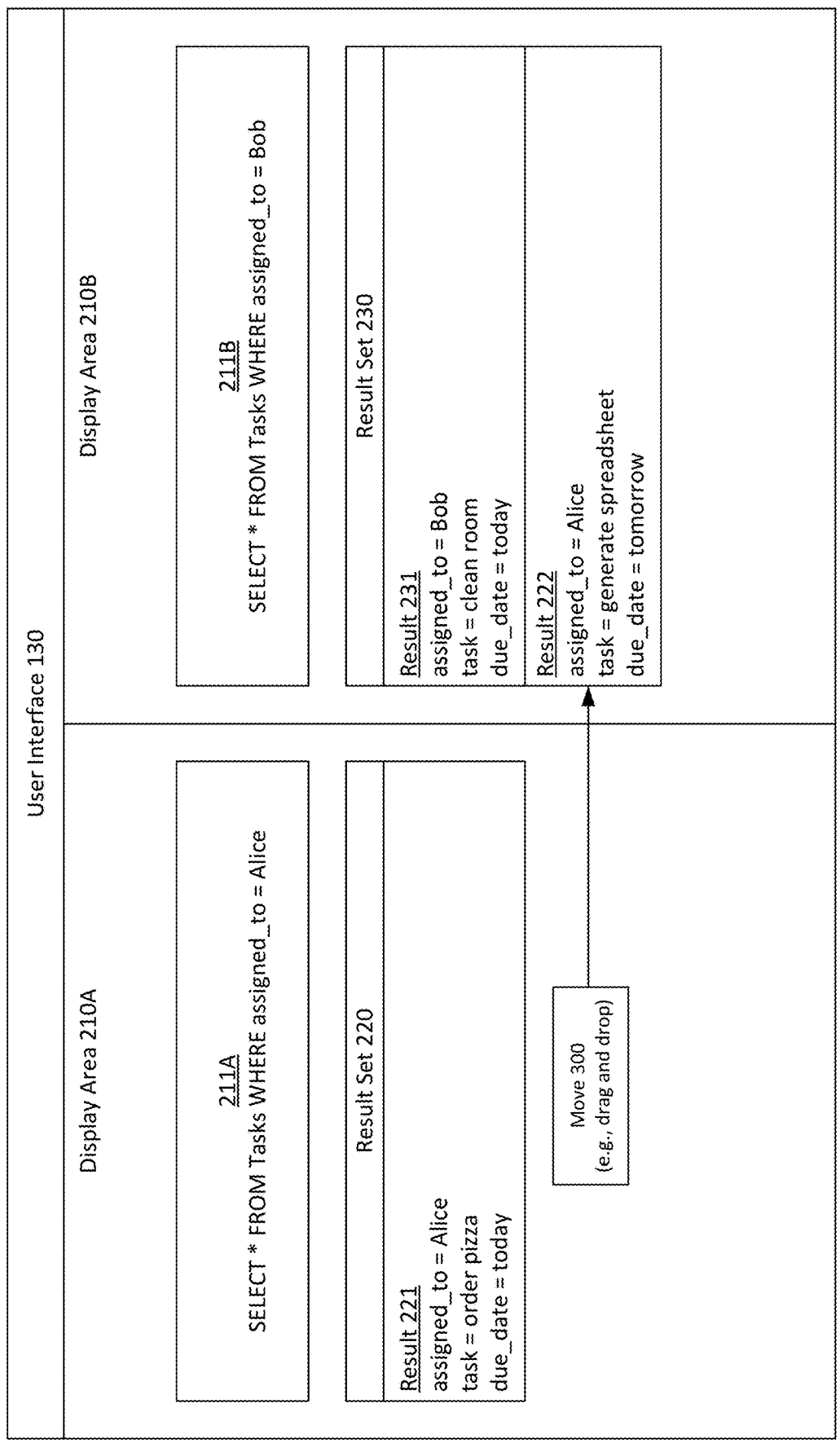
FIG. 3 is diagram illustrating a first example search result edit that may be used in accordance with the present disclosure.

In some examples, a user may edit the retrieved result sets 220 and 230, such as by moving one or more search results from one result set to another result set. Referring now to FIG. 3, an example search result edit will now be described in detail. In the particular example of FIG. 3, a user performs move 300 to move result 222 from result set 220 to result set 230. For example, move 300 may be accomplished by dragging and dropping result 222 from result set 220 to result set 230, such as by using a mouse, touchscreen, or other connected input device. The user may perform move 300 to indicate that the user wishes to re-assign the task of generating a spreadsheet from Alice to Bob. In some examples, upon receiving the user input for move 300 (e.g., a drag and drop), an analysis may be performed in order to determine the user's intent with respect to the input.

Figure 4:
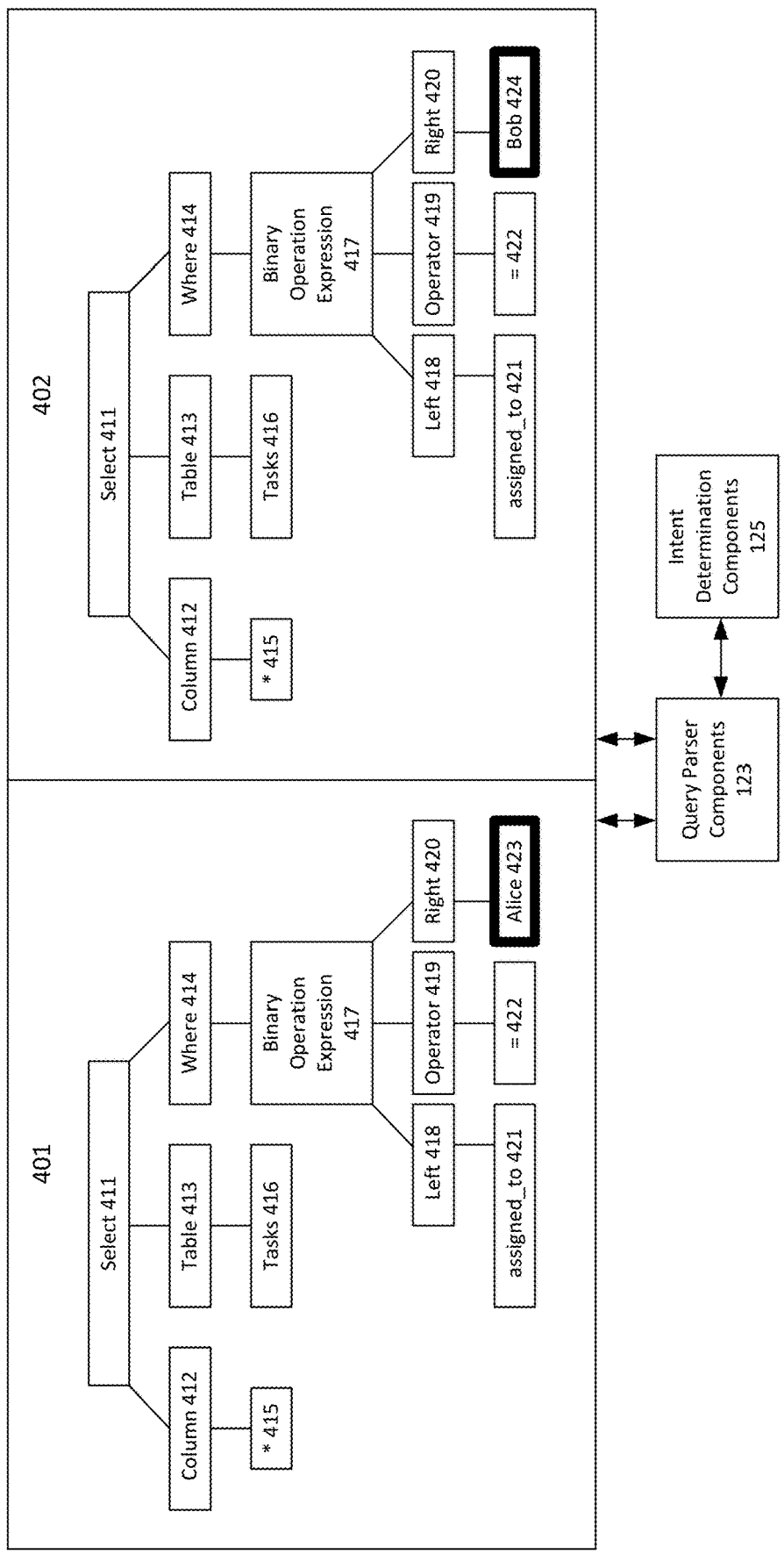
FIG. 4 is a diagram illustrating an example query parse comparison that may be used in accordance with the present disclosure.

A comparison of query 211A (the Alice query) and query 211B (the Bob query) may, in some examples, be performed in order to assist in determining the user's intent. In particular, in some cases, query 211A and query 211B may be parsed (e.g., into one more abstract syntax trees) and compared, one or more differences between the parsed queries may be identified, and the user's intent may then be determined based, at least in part, on the identified differences. Referring now to FIG. 4, an example parsing and comparison of queries 211A and 211B will now be described in detail. In particular, as shown in FIG. 4, tree 401 includes an example parsing of query 211A, while tree 402 includes an example parsing of query 211B. In some examples, trees 401 and 402 may include and/or represent one or more abstract syntax trees. As shown in tree 401, query 211A may be parsed into various nodes 411-423. Specifically, node 411 indicates that query 211A is a select statement including a column specification node 412, a table specification node 413, and a where specification node 414. Node 415 indicates that all columns are selected (as represented by the * notation), node 416 indicates that the Tasks table is selected, and node 417 indicates that the where specification includes a binary operation expression. In particular, the binary operation expression includes a left side node 418, an operator node 419, and a right side node 420. Node 421 indicates that the left side specifies the assigned_to attribute, node 422 indicates that the operator is an equal sign, and node 423 indicates that the right side specifies a value of Alice. By comparison, it can be seen that tree 402 includes nodes 411-422, which are identical to nodes 411-422 in tree 401. However, in tree 402, node 423 from tree 401 (indicating an assigned_to value of Alice), is replaced by node 424, which indicates an assigned_to value of Bob.

In some examples, the parsing of queries 211A and 211B may be performed by query parser components 123. Query parser components 123 may, in turn, provide the query parsing results (e.g., as shown in trees 401 and 402) to intent determination components 125, which may use the query parsing results and optionally other tools and/or information to determine the intent of the user with respect to move 300 of FIG. 3. For example, intent determination components 125 may compare trees 401 and 402 to determine the differences between the trees 401 and 402. In some examples, intent determination components 125 may traverse each of trees 401 and 402 from a top and/or origin node (e.g. node 411) down to lower and/or child nodes until each node in each tree is traversed and compared to one or more other nodes in the other tree. In the example of FIG. 4, it is seen that the only difference between trees 401 and 402 is that node 423 (Alice) in tree 401 is replaced with node 424 (Bob) in tree 402. Based on this difference, intent determination components 125 may determine that the only difference between query 211A and query 211B is the individual to whom the requested tasks are assigned. In particular, this individual is Alice in query 211A and Bob in query 211B.

In some examples, intent determination components 125 may include (or have access to) code that includes instructions for processing particular identified differences between trees 401 and 402. For example, in some cases, a portion of code may include instructions for a scenario, such as shown in FIG. 4, in which two compared query trees include a binary operation instruction (node 417) that includes an equal sign operator (node 422) with a left side that indicates an attribute (e.g., the assigned_to attribute indicated in node 421) and a right side that includes a literal (e.g., string) value (e.g., Alice in node 423 and Bob in node 424). The code may include instructions, for when this scenario is identified, to process the differences by changing the value of the attribute (e.g., the assigned_to attribute indicated in node 421) based on the literals indicated in the different trees (e.g., Alice in node 423 and Bob in node 424). Thus, it may be determined that the intent of move 300 is to re-assign the generate spreadsheet task from Alice to Bob. As should be appreciated, the scenario in which two query trees differ based on a right side of a binary operation instruction is merely one of many example scenarios in which search queries may differ between one another. In some examples, intent determination components 125 and/or other components may include (or have access to) many other types of code and/or instructions for identifying and processing many other types of differences between search queries.

Figure 5:
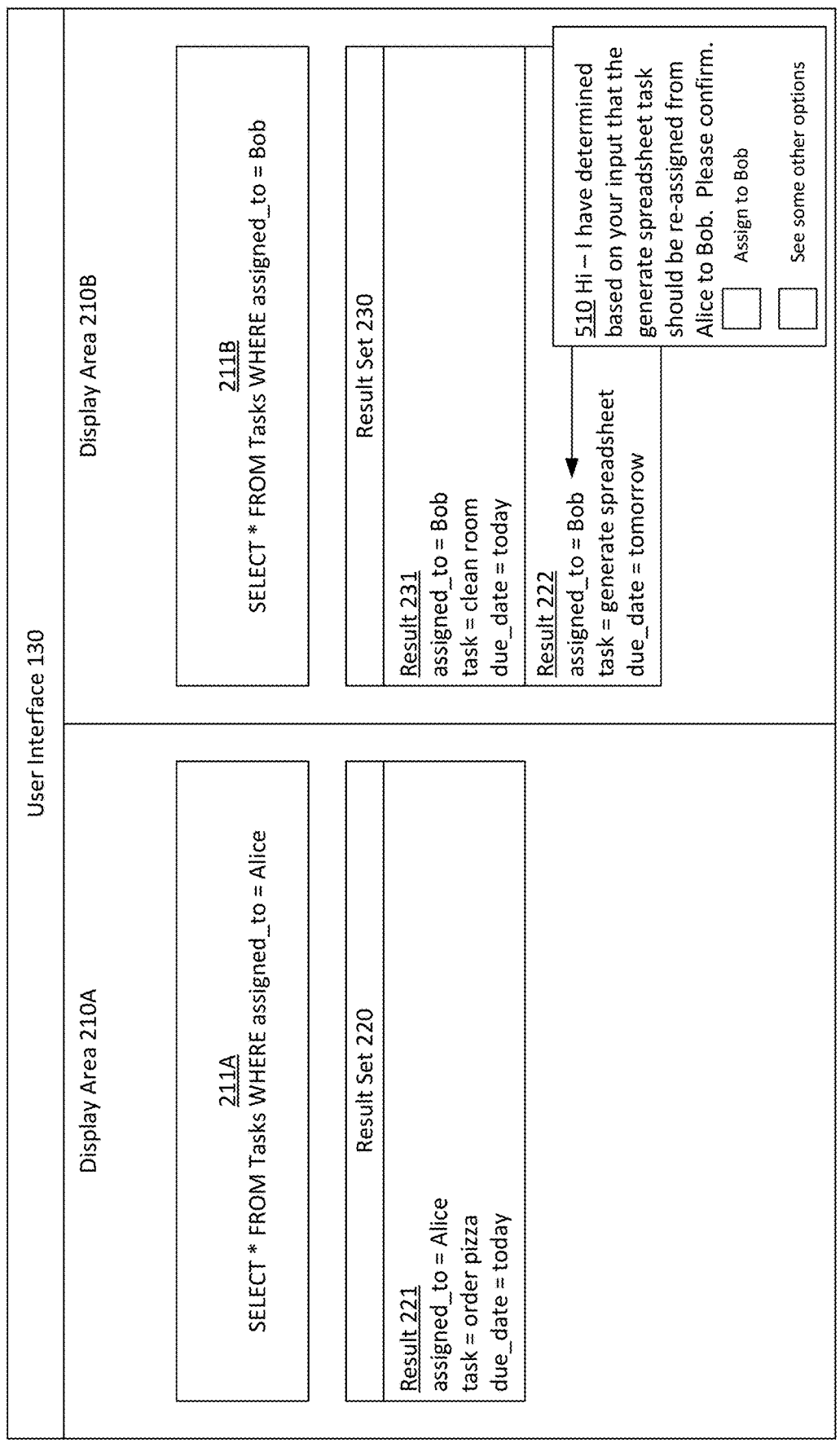
FIG. 5 is a diagram illustrating an example search result adjustment that may be used in accordance with the present disclosure.

In some examples, upon determining the intent of the received user input, intent determination components 125 may adjust the displayed results sets 220 and 230 based on the determined intent. Referring now to FIG. 5, an example result set adjustment will now be described in detail. In particular, as shown in FIG. 5, the assigned_to field of result 222 is changed from Alice (as shown in result 222 of FIG. 3) to Bob (as shown in result 222 of FIG. 5). In some examples, feedback from the user may be requested to confirm that the intent determined by intent determination components 125 is correct (e.g., matches or correlates with the actual user intent). For example, as shown in FIG. 5, user interface 130 may display a pop-up message 510 that may point to (or otherwise reference) the adjustment made to result 222 and that may ask the user to confirm this adjustment. In this example, message 510 indicates that it has been determined, based on the user's input, that the generate spreadsheet task corresponding to result 222 should be re-assigned from Alice to Bob. Checkboxes are included in message 510 to allow the user to either confirm the assignment to Bob or to request other options. In some examples, the other options may include an undo option (e.g., to move result 222 back to result set 220 and keep the corresponding task assigned to Alice), options to potentially assign result 222 to other entities (e.g., Bob's department, other individuals or entities, etc.), to change other attributes of result 222 (e.g., due date, task type, etc.), or other options.

In addition to adjusting result sets 220 and 230, intent determination components 125 may also notify data modification components 122 of FIG. 1 of the determined user intent for move 300. Data modification components 122 may then modify searchable data 110, on the user's behalf, in accordance with the determined intent. For example, in some cases, data modification components 122 may modify one or more values of one or more attributes of the searchable data 110, such as values associated with one or more tables, columns, rows, cells, entries, nodes, objects, entities, fields, tags, or any other attributes that may be used to organize and store searchable data. In the particular example of FIG. 5, data modification components 122 may interact with searchable data 110 to modify an entry of the Tasks table that corresponds to the generate spreadsheet task. Specifically, an entry corresponding to the assigned_to value for this task may be changed from a value of Alice (or a representation thereof) to a value of Bob (or a representation thereof). This modified value may then be stored in searchable data 110. It is noted that there is no requirement for the user to directly modify or otherwise interact with searchable data 110. Rather, data modification components 122 may modify searchable data 110 on the user's behalf, for example without requiring the user to have knowledge of techniques for modifying the underlying searchable data and/or to spend the time and effort required to manually perform those operations. Moreover, it is noted that, while FIGS. 2-5 show examples in which only a single result is moved/edited, users may often move or otherwise edit multiple different features of multiple different search results. In some examples, the ability to modify underlying searchable data on the user's behalf may be particularly advantageous for processing of large quantities of edits, thereby reducing the burden on the user to manually modify the underlying data for these edits and improving efficiency.

Figure 6:
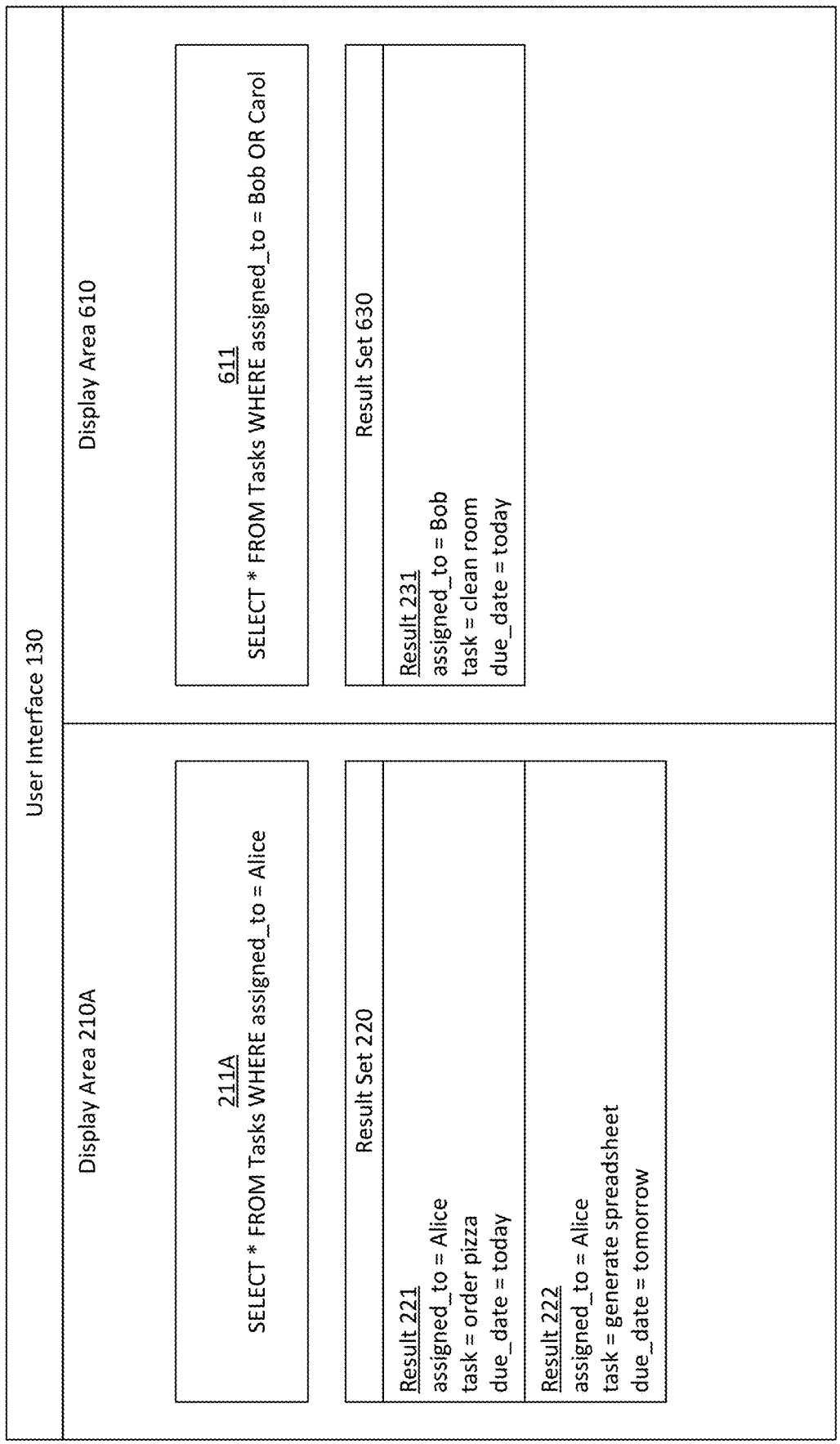
FIG. 6 is a flowchart illustrating second example search results that may be used in accordance with the present disclosure.

In some cases, when a user edits retrieved search result sets, the user's intent may be clearly determined using a query parsing or other analysis, for example such as depicted in FIG. 4 and described above. For example, the query parsing analysis depicted in FIG. 4 may clearly indicate that the intent of the move 300 is to re-assign result 222 from Alice to Bob. However, in some other cases, the user's intent may be ambiguous or may otherwise be interpreted to indicate more than one possible outcome. Referring now to FIG. 6, some example query results that may potentially trigger ambiguous user edits will now be described in detail. As shown in FIG. 6, a user has submitted a first search query 211A, which is identical to the search query 211A in the prior example of FIG. 2. However, in FIG. 6, search query 211B is replaced with a different search query 611. As shown in FIG. 6, query 611 is SELECT * FROM Tasks WHERE assigned_to =Bob OR Carol. This query may request all columns from the Tasks table where the assigned_to value is equal to Bob or Carol. As shown, user interface 130 of FIG. 6 includes two display areas 210A and 610. Display area 210A includes a result set 220 for query 211A, which is identical to display area 210A and result set 220 of FIG. 2. Display area 610 includes a result set 630 for query 611. Result set 630 includes a single result 231. As shown, result 231 is for a task of cleaning a room, which is assigned to Bob and which is due today. There are no results in result set 230 in which the assigned_to value is set to Carol, thereby indicating that no tasks in the Tasks table are currently assigned to Carol.

Figure 7:
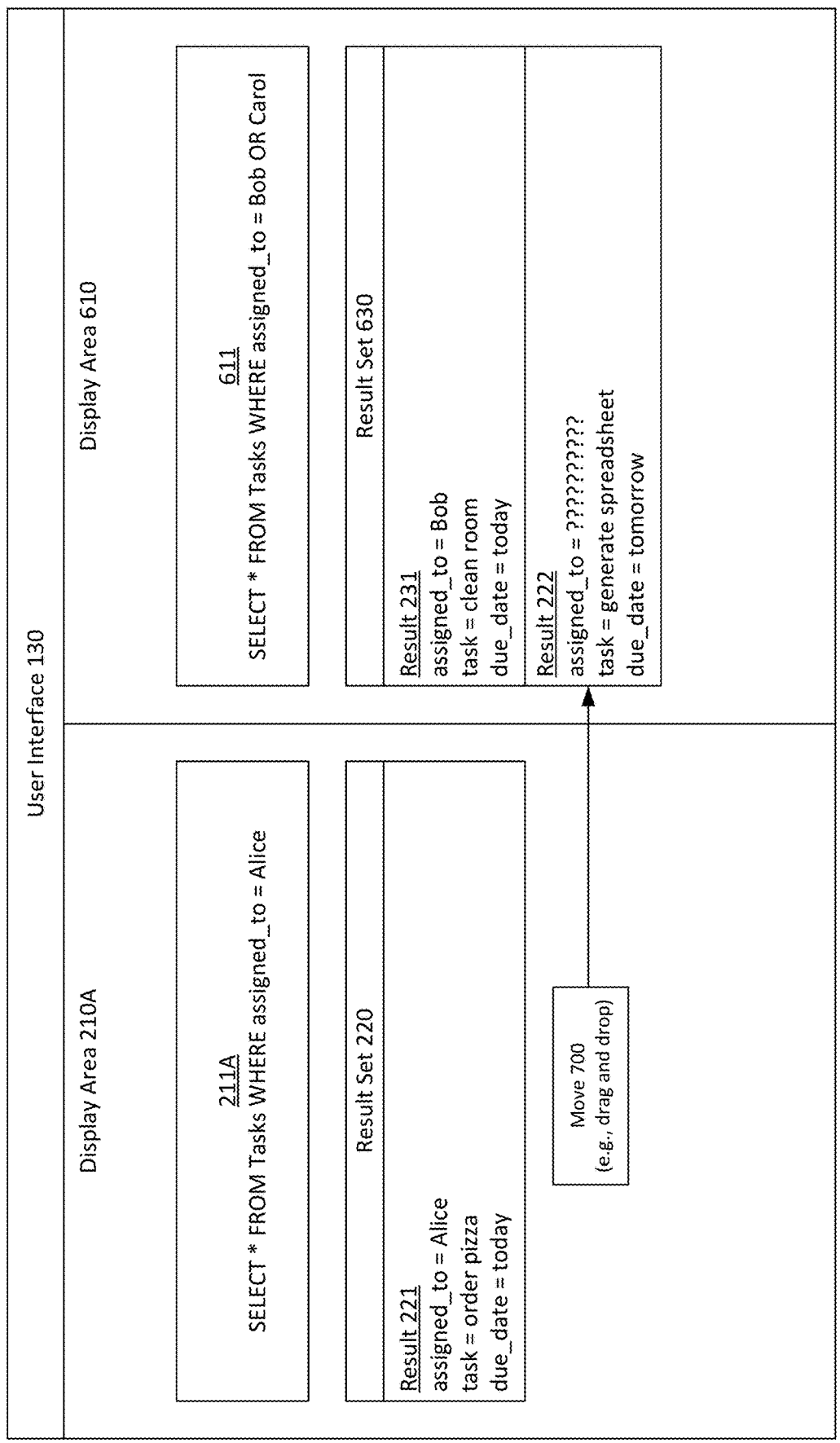
FIG. 7 is diagram illustrating a second example search result edit that may be used in accordance with the present disclosure.

In some examples, a user may edit the retrieved result sets 220 and 630, such as by moving one or more search results from one result set to another result set. Referring now to FIG. 7, a user performs move 700 to move result 222 from result set 220 to result set 630. For example, move 700 may be accomplished by dragging and dropping result 222 from result set 220 to result set 630, such as by using a mouse, touchscreen, or other connected input device. In this scenario, however, the user's intent may be ambiguous, for example because it may be unclear whether the user wishes to re-assign result 222 task to Bob, to Carol, or to both (or to potentially other entities). As shown in FIG. 7, the assigned_to attribute of result 222 is changed from Alice (as shown in FIG. 6) to a series of question marks (as shown in FIG. 7) to indicate that the user's intent is ambiguous with respect to this attribute. As should be appreciated, any number of other techniques may be employed to indicate (if desired) an ambiguous attribute to a user, such as changing a size, color, font, etc. of the ambiguous attribute(s) or using other alerts or notifications.

Figure 8:
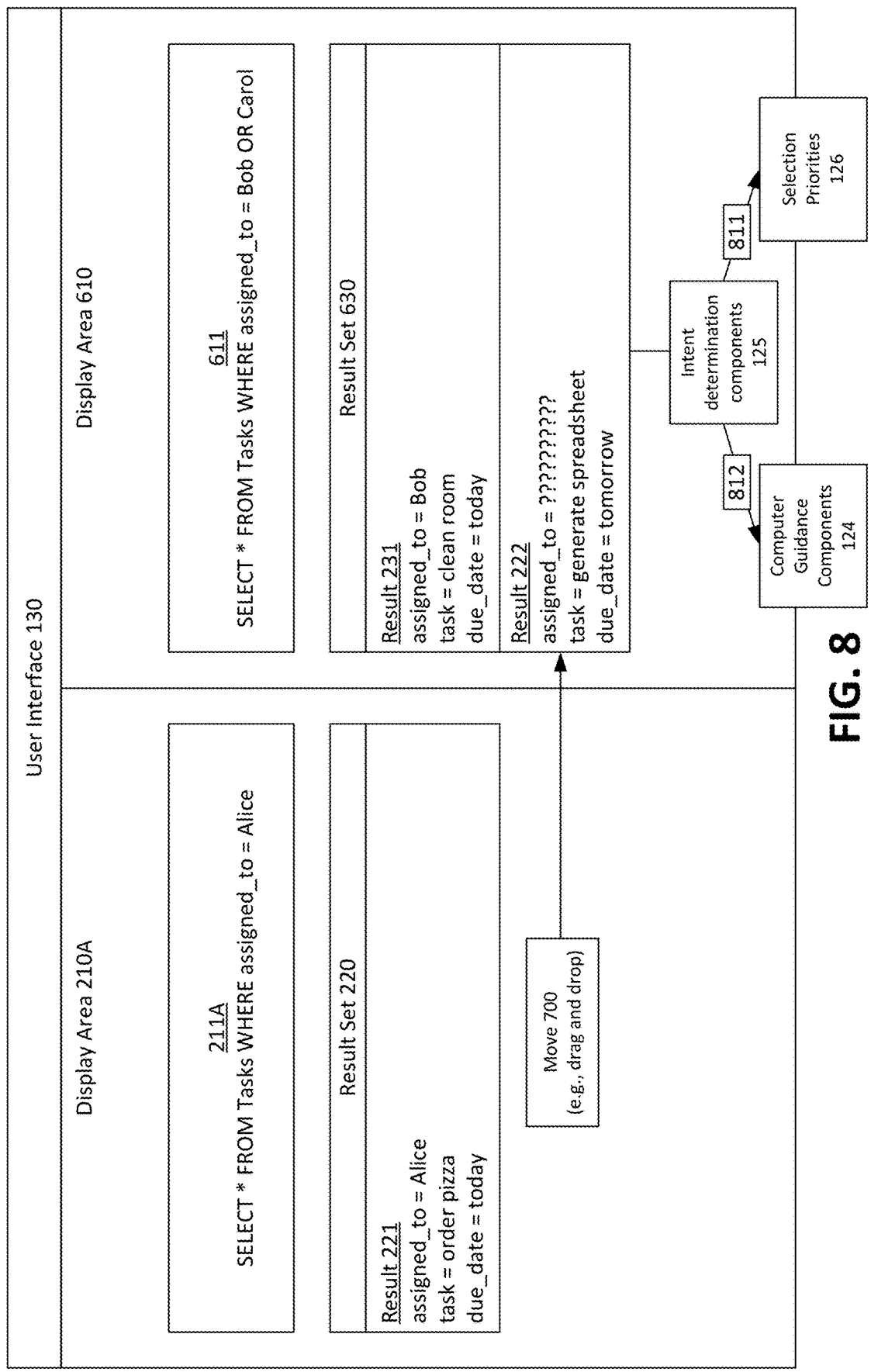
FIG. 8 is a diagram illustrating example intent determination interactions that may be used in accordance with the present disclosure.

Referring now to FIG. 8, some example intent determination techniques for ambiguous edits will now be described in detail. In particular, in some examples, when a user makes a result edit, such as move 700, intent determination components 125 may first attempt to determine the user's intent based on parsing of queries and comparison of parse results, such as described above with respect to FIG. 4. In the case of move 700, however, the query parse comparison may yield ambiguous results, because the assigned_to attribute has been changed from a value of Alice (for query 211A) to a value of Bob OR carol (for query 611). Thus, as set forth above, it may be ambiguous as to whether the user intends for result 222 to be assigned to Bob, to Carol, or to both (or to potentially other entities). In some examples, when the query parse comparison yields ambiguous results, intent determination components 125 may employ other strategies to assist in determining the user's intent. For example, in some cases, intent determination components may employ selection priorities 126 (e.g., as shown by arrow 811), computer guidance components 124 (e.g., as shown by arrow 812), and/or other strategies or components. In one specific example, intent determination components 125 may first employ selection priorities 126 to attempt to resolve the ambiguity associated with the user's edit, for example as described in detail below. If the selection priorities 126 resolve the ambiguity, then, in some examples, intent determination components 125 may resolve the ambiguity without requesting user input (or by merely requesting confirmation or approval of the resolved ambiguity). By contrast, if the selection priorities 126 do not resolve the ambiguity, then, in some examples, intent determination components 125 may resolve the ambiguity by requesting user input, for example via computer guidance components 124. It is noted, however, that the above described process is merely one example approach for determining user intent, and many other different approaches may be employed.

Selection priorities 126 may generally include any combination of one or more priorities for selecting user intent and/or otherwise selecting one or more modifications to perform upon searchable data. In some examples, selection priorities 126 may include priorities such as prior user selections, common data attributes, result availability, and other selection priorities. For example, in some cases, if the user had previously indicated that another task dragged to the Bob or Carol result set 630 should be re-assigned to Bob, then this may indicate that the user's intent is similarly to re-assign result 222 task to Bob. In some cases, in addition to the user that performed move 700, prior selections from other users may also be considered, such as users with similar attributes (e.g., same organization, company, department, etc.) as the user that performed move 700. As another example selection priority, in some cases, if Carol and Bob share a common data attribute, such as being members of particular department, then this may indicate that the user's intent is to re-assign result 222 to Carol's and Bob's department. As yet another example selection priority, in some cases, availability data for Bob and Carol may indicate that Carol has availability to perform the generate spreadsheet task and that Bob does not have availability, and this may cause the result 222 to be re-assigned to Carol instead of Bob.

In some examples, selection priorities 126 may include a number of ranked or otherwise weighted priorities. For example, in some cases, selection priorities 126 may be ranked such that prior selections by the same user receive a highest priority (e.g., are looked at first and/or with a heaviest weight to attempt to resolve the ambiguity), followed by common attributes of the potential task assignees, followed by availability of potential task assignees, followed by any number of additional selection priorities. Additionally, in some examples, selection priorities 126 may be selected, ranked, weighted, or otherwise organized based on user input. For example, in some cases, a particular user or group of users (e.g., company, organization, department, etc.) may request for certain selection priorities to be considered or not considered, ranked higher or lower, weighted more or less heavily, or otherwise be employed or not employed for determination of the user's intent.

In combination with or as an alternative to selection priorities 126, computer guidance components 124 may also be employed in order to assist in determining the user's intent. Computer guidance components 124 may generally include messages, forms, pop-ups, or other interfaces to assist the user in selecting data modifications and clarifying intent. In some examples, computer guidance components 124 may merely ask the user to confirm or approve of a computer-selected modification, for example made based on selection priorities 126 as described above. In some other examples, however, computer guidance components 124 may provide detailed interfaces to guide the user through an intent and modification selection process. For example, in some cases, computer guidance components 124 may identify and/or explain the ambiguity to the user and provide a list of possible selections and/or resolutions. In some examples, these lists may be ranked, ordered and/or organized based on selection priorities 126 and/or other factors.

Referring now to FIG. 9, some example intent determination interfaces associated with computer guidance components 124 and/or selection priorities 126 will now be described in detail. In particular, FIG. 9 includes a first interface 901 that provides a list of potential selections to assist in clarifying the user's intent with respect to move 700 of FIGS. 7 and 8. As shown, interface 901 explains to the user that move 700 has made it unclear to who the user wishes to assign result 222. Interface 901 provides four checkboxes that allow the user to select to assign result 222 to Bob, to Carol, to Bob and Carol, or to Bob's and Carol's department (e.g., for scenarios in which Bob and Carol are included in the same department). Interface 902 relates to another example in which it may be determined that the user has recently assigned a number of other search results to Bob. In this example, interface 902 asks whether the user would like to confirm the assignment of result 222 to Bob or would like to see some other options (e.g., Carol, Bob and Carol, Bob's and Carol's department, etc.). Interface 903 relates to another example in which it may be determined that Bob and Carol work in the same department. In this example, interface 903 asks whether the user would like to confirm the assignment of result 222 to Bob's and Carol's department or would like to see some other options. Interface 904 relates to yet another example in which it may be determined that result 222 is due tomorrow, that Bob is on vacation tomorrow, and that Carol is working tomorrow and available all day. In this example, interface 904 asks whether the user would like to confirm the assignment of result 222 to Carol or would like to see some other options.

In some examples, a search result movement or other user edit may result in multiple potential ambiguities, and computer guidance components 124 may include multiple forms, pages or other interfaces to guide the user. For example, while query 611 indicates an assignment to Bob OR Carol, other queries could include multiple OR statements (or other potential ambiguities) that may raise the complexity of the intent determination process. For example, consider the scenario in which query 611 is replaced with the following query:
SELECT * FROM Tasks WHERE (assigned_to =Bob OR Carol) OR (due=today)
In this example, moving result 222 from result set 220 into a result set associated with the above query would raise multiple ambiguities, including whether the user intended to change the value of the assigned_to attribute of result 222 (e.g., to Bob or Carol or both), whether the user intended to change the due_date attribute of result 222 (e.g., from tomorrow to today), or whether the user intended to change both the assigned_to and the due_date attributes. In this scenario, computer guidance components 124 could include multiple interfaces for guiding the user through these determinations. For example, a first interface could ask the user which attribute the user wished to change (e.g., assigned_to, due_date, or both). A next interface could then display a list of potential selections based on the selected attribute type. For example, if the user selected to change only the assigned_to attribute, then potential selections could include Bob, Carol, or both. If the user selected to change only the due_date attribute, then potential selections could include changing the due date from tomorrow to today. Additionally, if the user selected to change both the assigned_to attribute and the due_date attribute, then potential selections could include Bob and today, Carol and today, or both Bob and Carol and today. Many other types of computer guidance components 124, other interfaces, and other selection techniques may also be employed.

Figure 10:
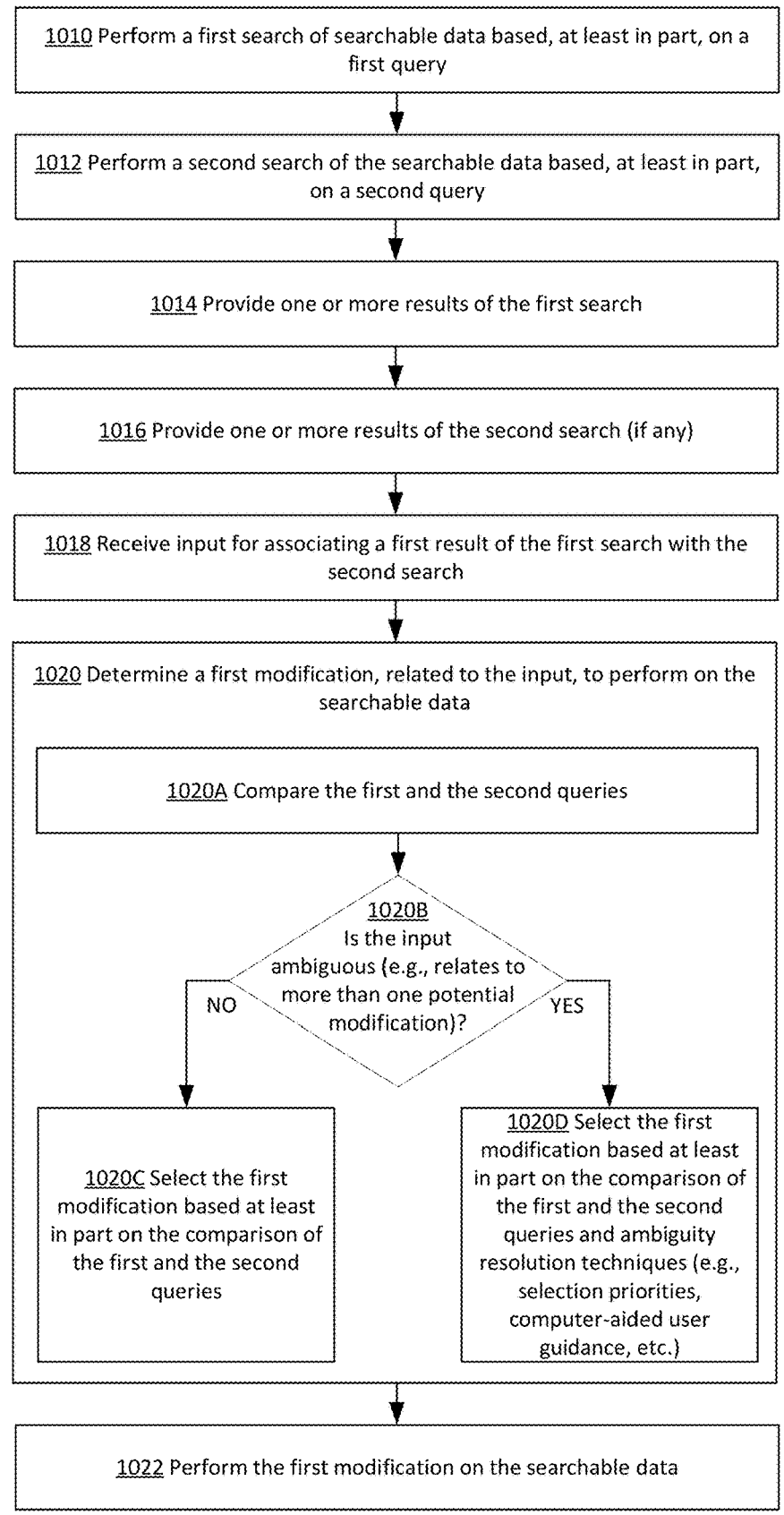
FIG. 10 is flowchart illustrating an example process for searching and modifying of information that may be used in accordance with the present disclosure.

FIG. 10 is flowchart illustrating an example process for searching and modifying of information that may be used in accordance with the present disclosure. The process of FIG. 10 is initiated at operation 1010, at which a first search is performed on searchable data based at least in part on a first query. For example, as shown in FIGS. 2 and 6, a first search to select all columns from a Tasks table where an assigned_to value is equal to Alice may be performed based on a first query (e.g., query 211A). The searchable data may include, for example, one or more databases, information services, documents, tables, or other collections of searchable information. At operation 1012, a second search is performed on searchable data based at least in part on a second query. For example, as shown in FIG. 2, a second search to select all columns from the Tasks table where an assigned_to value is equal to Bob may be performed based on a second query (e.g., query 211B). As another example, as shown in FIG. 6, a second search to select all columns from the Tasks table where an assigned_to value is equal to Bob or Carol may be performed based on a second query (e.g., query 611).

At operation 1014, one or more results of the first search may be provided, and, at operation 1016, one or more results of the second search (if any) may be provided. In some examples, the results of the first search and the results of the second search may be displayed in separate display areas. For example, as shown in FIG. 2, results of the first search (e.g., results 221 and 222) are displayed in a first display area 210A, while a result of the second search (e.g., result 231) is displayed in a second display area 210B. As another example, as shown in FIG. 6, results of the first search (e.g., results 221 and 222) are displayed in a first display area 210A, while a result of the second search (e.g., result 231) is displayed in a second display area 610.

At operation 1018, input is received for associating a first result of the first search with the second search. In some examples, the received input may be for moving (e.g., dragging and dropping) the first result from a first display area associated with the first search to a second display area associated with the second search. For example, as shown in FIG. 3, move 300 results in moving result 222 from display area 210A to display area 210B. As another example, as shown in FIG. 7, move 700 results in moving the result 222 from display area 210A to display area 610.

At operation 1020, at least a first modification, related to the input, to perform on the searchable data is determined. As set forth above, in some examples, the first modification may include changing a value of one or more attributes of the searchable data. In particular, in some of the specific examples described above, the first modification may include changing a value of an assigned_to attribute for a generate spreadsheet task, such as from Alice to Bob, Carol, Bob and Carol, or potentially to other values.

In some examples, the first modification may be determined based, at least in part, on a comparison of the first query and the second query, such as will now be described with respect to sub-operations 1020A-D. In particular, at sub-operation 1020A, the first query may be compared to the second query. Specifically, in some examples, sub-operation 1020A may include parsing the first query into a first set of nodes, such as a first abstract syntax tree, and parsing the second query into a second set of nodes, such as a second abstract syntax tree. For example, as shown in FIG. 4, query 211A may be parsed into a tree 401, while query 211B may be parsed into a tree 402. The first set of nodes and the second set of nodes may then be compared to one another, and one or more differences between the first set of nodes and the second set of nodes may then be identified. For example, as shown in FIG. 4, trees 401 and 402 differ in that node 423 (representing Alice) of tree 401 is replaced, in tree 402, with node 424 (representing Bob). The first modification may then be determined based, at least in part, on the one or more identified differences. For example, the differences between nodes 423 and 424 may indicate that the value of the assigned_to attribute for result 222 (the generate spreadsheet task) will be modified from Alice to Bob.

At sub-operation 1020B, it may be determined whether the comparison between the first and the second queries results in ambiguity. In some examples, sub-operation 1020B may include determining whether more than one (i.e., a plurality) of potential modifications are related to the input received at operation 1018. In particular, in some cases, when only a single potential modification is related to the input, then the comparison may be determined to not result in ambiguity. By contrast, in some cases, when more than one (i.e., a plurality) of potential modifications are related to the input, then the comparison may be determined to result in ambiguity. In some examples, a determination of whether a plurality of potential modifications, or only a single potential modification, is/are related to the input may be based, at least in part, on the comparison between the first and the second queries.

In particular, in some examples, when it is determined that the identified differences between the parsed first and second queries indicate only a single potential modification, then the input may be determined to relate to only a single potential modification. For example, as set forth above, in the scenario when query 211A is compared to query 211B, the identified difference between these queries is a task assignment to Alice (e.g., for query 211A) compared to a task assignment to Bob (e.g., for query 211B). Thus, the comparison indicates only a single potential modification, which is a re-assignment of the corresponding task from Alice to Bob. Accordingly, in the example of queries 211A and 211B, the comparison of the first and the second queries may be determined to not result in ambiguity.

By contrast, in some examples, when it is determined that the identified differences between the parsed first and second queries indicate a plurality of potential modifications, then the input may be determined to relate to a plurality of potential modifications. For example, as set forth above, in the scenario when query 211A is compared to query 611, the identified difference between these queries is a task assignment to Alice (e.g., for query 211A) compared to a task assignment to Bob OR Carol (e.g., for query 611). Thus, the comparison indicates a plurality of potential modification, because it is ambiguous as to whether the user intends to re-assign the corresponding task from Alice to Bob, to Carol, to Bob and Carol, or potentially to other entities (e.g., Bob's and Carol's department, etc.). Accordingly, in the example of queries 211A and 611, the comparison of the first and the second queries may be determined to result in ambiguity.

When the comparison of the first and the second queries is determined to not result in ambiguity (e.g., as in the comparison of queries 211A and 211B), the first modification may, at operation 1020C, be selected based, at least in part, on the comparison of the first and the second queries. For example, in the case of move 300 for queries 211A and 211B, the first modification, which is a re-assignment of the generate spreadsheet task from Alice to Bob, may be determined based, at least in part, on the query comparison as described above. As also set forth above, in some examples, the user may be asked to confirm or approve of this selected modification.

By contrast, when the comparison of the first and the second queries is determined to result in ambiguity (e.g., as in the comparison of queries 211A and 611), the first modification may, at operation 1020D, be selected based, at least in part, on the comparison of the first and the second queries and one or more ambiguity resolution techniques. In some examples, the ambiguity resolution techniques may include the use of selection priorities, computer-aided user guidance interfaces, and other ambiguity resolution techniques. In particular, in some examples, the first modification may be selected from the plurality of potential modifications based, at least in part, on one or more selection priorities. As set forth above, in some examples, the one or more selection priorities may include one or more prior selections associated with an issuer of the input, one or more common attributes associated with the plurality of potential modifications, one or more availabilities associated with the plurality of potential modifications, and/or other selection priorities. Some example uses and implementations of these and other selection priorities are described in detail above and are not repeated here. Also, in some examples, the first modification may be selected from the plurality of potential modifications based, at least in part, on one or more user selections. For example, in some cases, one or more computer-aided guidance interfaces or other guidance components may be displayed or to guide the user through the process of selecting one or more modifications that match/correspond to the user's intent. Some example uses and implementations of various computer guidance components are described in detail above and are not repeated here.

At operation 1022, the first modification determined at operation 1020 is performed on the searchable data. For example, in some cases, one or more values of one or more attributes of the searchable data may be modified, such as values associated with one or more tables, columns, rows, cells, entries, nodes, objects, entities, fields, tags, or any other attributes that may be used to organize and store searchable data. For example, in the case of move 300 of FIG. 3, an entry of the Tasks table that corresponds to the generate spreadsheet task may have its assigned_to attribute changed from a value of Alice (or a representation thereof) to a value of Bob (or a representation thereof). As another example, in the cases of move 700 of FIG. 7, this value may be changed, depending upon the result of the ambiguity resolution process, from Alice to Bob, to Carol, or potentially to other values. It is again noted that there is no requirement for the user to directly modify or otherwise interact with searchable data. Rather, the searchable data may be modified on behalf of the user without manual editing of the searchable data by the user, thereby improving efficiency and providing other advantages as described in detail above.

Figure 11:
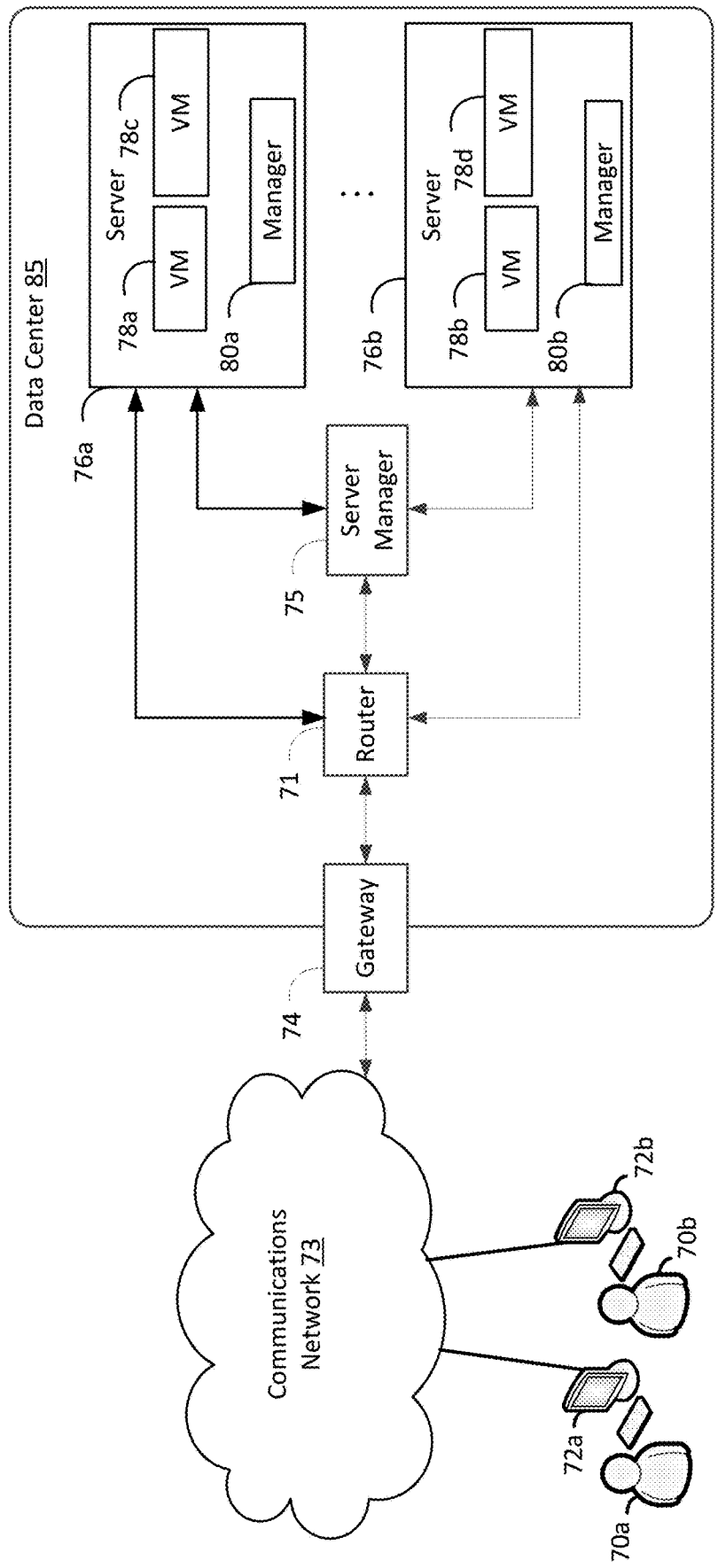
FIG. 11 is a diagram illustrating an example system for transmitting and providing data that may be used in accordance with the present disclosure.

An example system for transmitting and providing data will now be described in detail. In particular, FIG. 11 illustrates an example computing environment in which the embodiments described herein may be implemented. FIG. 11 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 11, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 11 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 11, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 11, a server manager 75 is also employed to at least in part direct various communications to, from and/or between servers 76a and 76b. While FIG. 11 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 11 has been greatly simplified and that many more networks and networking devices may be utilized to interconnect the various computing systems disclosed herein. These network topologies and devices should be apparent to those skilled in the art.

It should also be appreciated that data center 85 described in FIG. 11 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 12:
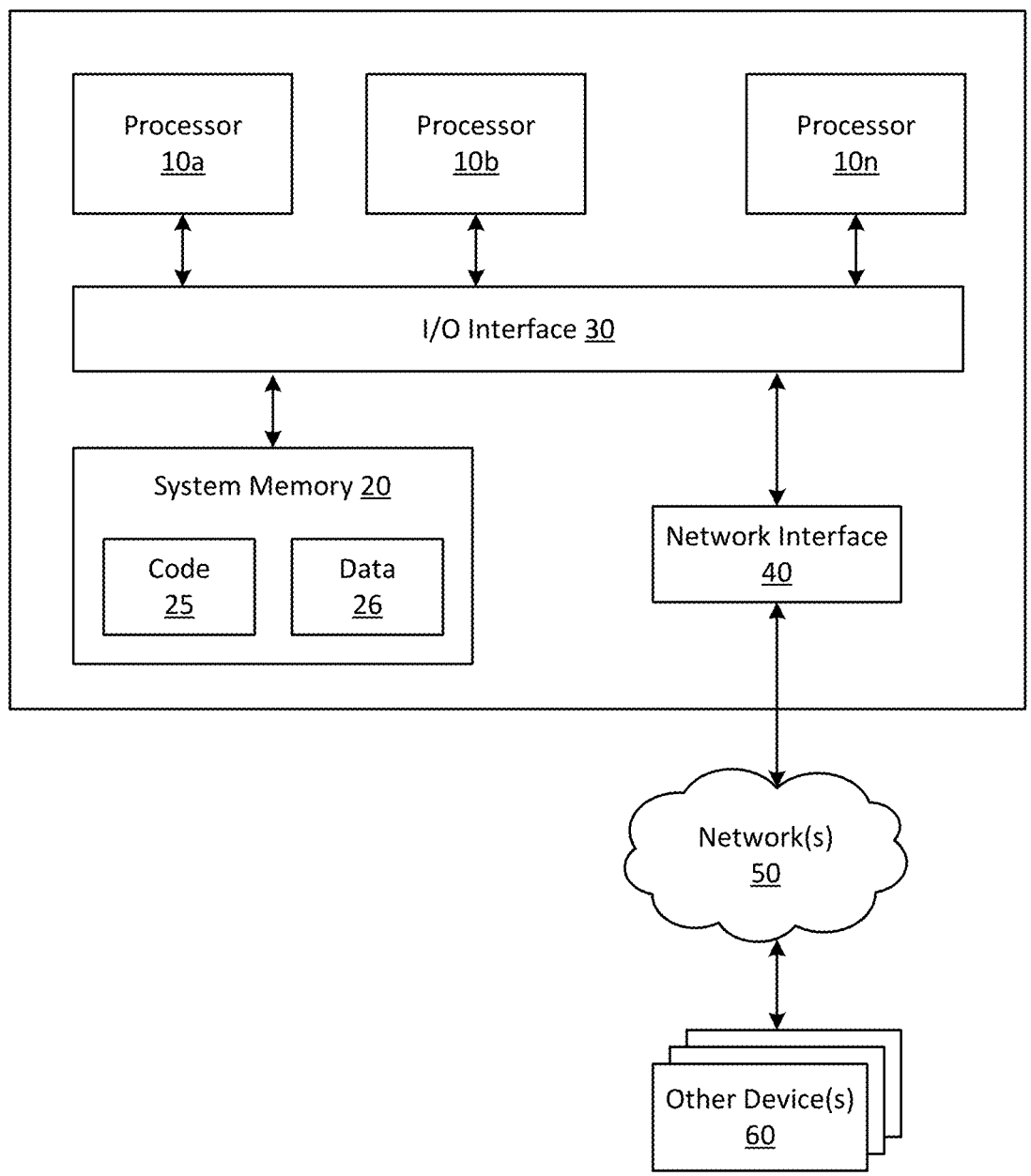
FIG. 12 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 12 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for searching and modifying of information comprising:
   one or more processors; and
   one or more memories having stored therein instructions that, upon execution by the one or more processors, cause the computing system perform operations comprising:

performing a first search of searchable data based, at least in part, on a first query, wherein the first query is associated with a first entity;

performing a second search of the searchable data based, at least in part, on a second query, wherein the second query is associated with a plurality of entities comprising a second entity and a third entity;

displaying one or more results of the first search in a first display area associated with the first search, wherein the one or more results include a first result corresponding to an assignment to the first entity;

receiving input for moving a first result of the first search from the first display area to a second display area associated with the second search;

determining, based on the input, a plurality of modifications to the searchable data, the plurality of modifications including a first modification corresponding to a first re-assignment from the first entity to the second entity, a second modification corresponding to a second re-assignment from the first entity to the third entity, and a third modification corresponding to a third re-assignment from the first entity to at least the second entity and the third entity;

selecting, from the plurality of modifications, a selected modification to perform on the searchable data; and performing the selected modification on the searchable data.

2. The computing system of claim 1, wherein the selected modification is selected from the plurality of modifications based, at least in part, on one or more selection priorities.

3. The computing system of claim 2, wherein the one or more selection priorities comprise one or more prior selections associated with an issuer of the input, one or more common attributes associated with the plurality of modifications, or one or more availabilities associated with the plurality of modifications.

4. A computer-implemented method for searching and modifying of information comprising:

performing a first search of searchable data based, at least in part, on a first query, wherein the first query is associated with a first entity;

performing a second search of the searchable data based, at least in part, on a second query, wherein the second query is associated with a plurality of entities comprising a second entity and a third entity;

providing one or more results of the first search, wherein the one or more results include a first result corresponding to an assignment to the first entity;

receiving input for associating a first result of the first search with the second search;

determining, based on the input, a plurality of modifications to the searchable data, the plurality of modifications including a first modification corresponding to a first re-assignment from the first entity to the second entity, a second modification corresponding to a second re-assignment from the first entity to the third entity, and a third modification corresponding to a third re-assignment from the first entity to at least the second entity and the third entity;

selecting, from the plurality of modifications, a selected modification to perform on the searchable data; and performing the selected modification on the searchable data.

5. The computer-implemented method of claim 4, wherein the selected modification is selected from the plurality of modifications based, at least in part, on one or more selection priorities.

6. The computer-implemented method of claim 5, wherein the one or more selection priorities comprise one or more prior selections associated with an issuer of the input, one or more common attributes associated with the plurality of modifications, or one or more availabilities associated with the plurality of modifications.

7. The computer-implemented method of claim 4, wherein the selected modification is selected from the plurality of modifications based, at least in part, on one or more user selections.

8. The computer-implemented method of claim 4, wherein the determining comprises:

parsing the first query into a first set of nodes;

parsing the second query into a second set of nodes;

comparing the first set of nodes and the second set of nodes;

identifying one or more differences between the first set of nodes and the second set of nodes; and determining the plurality of modifications based, at least in part, on the one or more differences.

9. The computer-implemented method of claim 4, wherein the input is for moving the first result from a first display area associated with the first search to a second display area associated with the second search.

10. The computer-implemented method of claim 4, wherein the selected modification is performed on the searchable data on behalf of a user without manual editing of the searchable data by the user.

11. One or more non-transitory computer-readable storage media having stored thereon instructions that, upon execution by a computing device, cause the computing device to perform operations comprising:

performing a first search of searchable data based, at least in part, on a first query, wherein the first query is associated with a first entity;

performing a second search of the searchable data based, at least in part, on a second query, wherein the second query is associated with a plurality of entities comprising a second entity and a third entity;

providing one or more results of the first search, wherein the one or more results include a first result corresponding to an assignment to the first entity;

receiving input for associating a first result of the first search with the second search;

determining, based on the input, a plurality of modifications to the searchable data, the plurality of modifications including a first modification corresponding to a first re-assignment from the first entity to the second entity, a second modification corresponding to a second re-assignment from the first entity to the third entity, and a third modification corresponding to a third re-assignment from the first entity to at least the second entity and the third entity;

selecting, from the plurality of modifications, a selected modification to perform on the searchable data; and performing the selected modification on the searchable data.

12. The one or more non-transitory computer-readable storage media of claim 11, wherein the selected modification is selected from the plurality of modifications based, at least in part, on one or more selection priorities.

13. The one or more non-transitory computer-readable storage media of claim 12, wherein the one or more selection priorities comprise one or more prior selections associated with an issuer of the input, one or more common attributes associated with the plurality of modifications, or one or more availabilities associated with the plurality of modifications.

14. The one or more non-transitory computer-readable storage media of claim 11, wherein the selected modification is selected from the plurality of modifications based, at least in part, on one or more user selections.

15. The one or more non-transitory computer-readable storage media of claim 11, wherein the determining comprises:
   parsing the first query into a first set of nodes;
   parsing the second query into a second set of nodes;
   comparing the first set of nodes and the second set of nodes;
   identifying one or more differences between the first set of nodes and the second set of nodes; and
   determining the plurality of modifications based, at least in part, on the one or more differences.

16. The one or more non-transitory computer-readable storage media of claim 11, wherein the input is for moving the first result from a first display area associated with the first search to a second display area associated with the second search.

17. The one or more non-transitory computer-readable storage media of claim 11, wherein the selected modification is performed on the searchable data on behalf of a user without manual editing of the searchable data by the user.

* * * * *